United States Patent [19]

Sasaki et al.

[11] Patent Number: 4,890,120

[45] Date of Patent: Dec. 26, 1989

[54] THERMAL TRANSFER TYPE PRINTING DEVICE CAPABLE OF SELECTING INK SHEETS

[75] Inventors: Eiichi Sasaki, Yokohama; Takashi Mori; Tetsuo Watanabe, both of Tokyo, all of Japan

[73] Assignee: Ricoh Company, Ltd., Tokyo, Japan

[21] Appl. No.: 224,767

[22] Filed: Jul. 27, 1988

[30] Foreign Application Priority Data

| | | | |
|---|---|---|---|
| Jan. 9, 1987 | [JP] | Japan | 62-132254[U] |
| Jul. 27, 1987 | [JP] | Japan | 62-185626 |
| May 27, 1988 | [JP] | Japan | 63-128271 |

[51] Int. Cl.$^4$ .......... G01D 15/10

[52] U.S. Cl. .......... 346/76 PH; 400/120

[58] Field of Search .......... 400/120; 346/76 PH

[56] References Cited

FOREIGN PATENT DOCUMENTS 0188164 8/1986 Japan .......... 400/120

*Primary Examiner*—Clifford C. Shaw

*Assistant Examiner*—Huan H. Tran

*Attorney, Agent, or Firm*—Oblon, Spivak, McClelland, Maier & Neustadt

[57] ABSTRACT

A thermal transfer type printing device, for instance, a character printer having a thermal head for use in printer, copier, facsimile device, etc. and ink medium such as ink ribbon, ink sheet or the like. One of a plurality of ink sheets is selectively used and a print control is performed in accordance with a sort of the ink sheet. The printing device comprises a thermal head, ink sheets, installment means capable of selecting one of ink sheets and selectively installing the same on the printing device, a heat energy source, and switching means for changing heat energy which drives the thermal head depending on the sort of ink sheet to be selected.

26 Claims, 12 Drawing Sheets

THERMAL TRANSFER TYPE PRINTING DEVICE CAPABLE OF SELECTING INK SHEETS

BACKGROUND OF THE INVENTION

1. Field of the Invention

The present invention relates to a thermal transfer type printing device, in particular, a character printer comprising a thermal head for use in printer, copier, facsimile device, etc. and ink medium such as ink ribbon, ink sheet or the like.

2. Description of the Prior Art

Various types of character printing devices comprising a thermal head have been used heretofore in the field of printer, copier, facsimile device, etc. In the case of printing characters by use of thermal head, an ink sheet is heated by the thermal head and the heated sheet makes a pressed contact with recording paper. Printing of characters is performed in such a way.

Various different printing processes are well known in the past. Namely, those are the processes of printing characters by use of an ink sheet containing therein various species of ink: thermofusible ink, sponge ink and sublimation ink, etc.

Those species of ink have their own inherent characteristics in accordance with the respective ink processes. For instance, although the thermofusible ink is suitable for printing characters, it isn't suitable for printing full-color picture image because of its incapability of expressing halftone in the case of printing picture images. On the contrary, the sublimation ink can easily express halftone. In consequence, the same is suitable for printing full-color picture image. However, it takes a lot of time to develop color on the recording sheet owing to its characteristic of image processing compared with the case of using the thermofusible ink, so that the sublimation ink isn't suitable for printing characters. The sponge ink has characteristic intermediate between that of the thermofusible ink and that of the sublimation ink. Since the conventional (prior art) printing device is so constructed as to fit to either one sort of ink processes, it follows that the printing device is properly used in accordance with its use. As a result, interface of respective printing devices has to be changed, and further the size of paper has to be also changed. In such a way, it is very inconvenient to use the conventional printing device.

In addition to the above-mentioned, generally, a printing device in which a printing head constructed with, for instance, a thermal head is pressedly brought into contact with a platen through an ink sheet and a recording paper is well known heretofore. Such kind of printing device is constructed, for instance, for use in facsimile, printer, copier and so on. Generally, in such printing device, the ink sheet is assembled in a state of being accommodated in a cassette. In such printing device, a print control is performed in accordance with the sort of ink sheet by use of a cassette accommodating various different kinds of ink sheet. For instance, the Japanese laid-open patent specification; Showa 60-230765/1985 discloses that, in the ordinary thermal transfer type printer, the pulse width of the applied voltage is changed in accordance with the sort of paper such as ordinary paper employed for printing or transfer paper especially employed for making OHP film, and thereby the optical density corresponding to its purpose can be obtained.

In the case of employing the cassette accommodating such ink sheet, since the cost of the cassette case itself is relatively high compared with the cost of ink sheet, the above-mentioned matter results in the increase of print cost. It is considered to be a demerit of such the printing device. In consideration of such actual situation as mentioned above, it may be profitable from the viewpoint of its cost to install the ink sheet itself, for instance, as an ink sheet roll in the printing device's main body. However, there is no printing device provided with means capable of automatically judging the sort of ink in the past. Although the construction in which the selection switch mounted on the operational panel designates manually the print mode of several sorts of ink sheet has been adopted heretofore to take an illustration, there was a fear of performing other different print control in such the adopted construction of process (mode) was done in a wrong way.

SUMMARY OF THE INVENTION

It is an object of the present invention to solve the above-mentioned problems concerning the conventional printer;

It is another object of the present invention to provide a printing device in which various species of ink processes can be exchangeably utilized as occasion demands by use of only one printing device;

It is still another object of the present invention to provide a printing device capable of automatically judging the sort of ink sheet and performing the print control without any mistake; and It is still another object of the present invention to enable the number of ink medium's color to automatically discriminate in the thermal head type printing device such as the above-mentioned thermal transfer printer.

These and other objects are achieved according to the present invention by providing a new and improved thermal transfer type printing device capable of changing heat energy which drives the thermal head depending on the sort of ink sheet to be selectively employed in accordance with the state discriminated by an automatic discrimination mechanism.

Other objects and features of the present invention will be apparent from the following detailed description and claims in accordance with the accompanying drawings.

BRIEF DESCRIPTION OF THE DRAWINGS

FIG. 6(*d*) is a view generally showing the print pulse signal in the case of modulating its pulse width;

DESCRIPTION OF THE PREFERRED EMBODIMENTS

Figure 1:
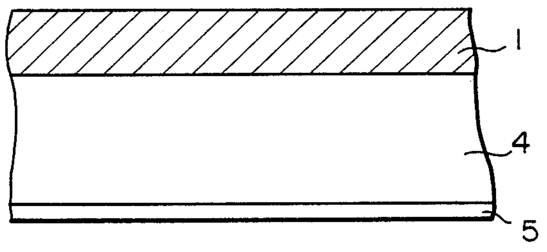
FIGS. 1(*a*) through 1(*c*) are construction views showing, respectively, ink sheets applied to the present invention.
Figure 1:
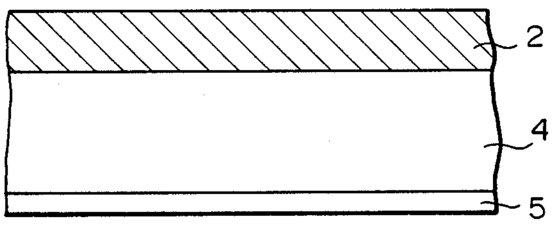
Figure 1:
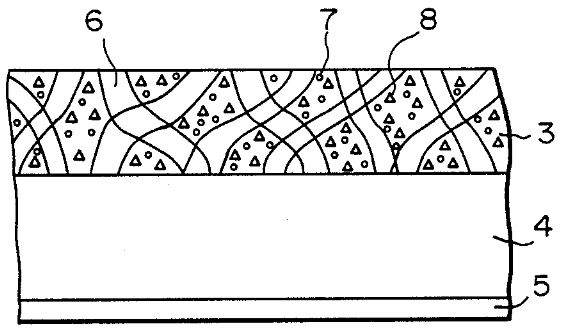

The present invention is characterized in that a plurality of ink sheets are exchangeably set in order to attain the above-mentioned object and the printing device is so constructed that the operational heat energy for driving thermal head can be converted in accordance with the selected ink sheet.

The construction and its operational function of the present invention will be described in detail hereinafter on the basis of embodiments shown in the drawings.

Recently, several thermal transfer recording mediums and systems capable of yielding halftone (continuous tone) printing for forming full color image, without using dot matrix methods (i.e. Micro Font Method, Dither Method, etc.), have been studied. A special thermal transfer recording medium for halftone printing has been developed by making the micro porocity matrix of resin in the thermofusible ink layer. Especially, the mechanism of ink transfer and the factors for controlling the image gradation in the recording medium have been studied, and the contents of the above items are described, hereinafter.

FIGS. 1(*a*) through 1(*c*) are construction views showing, respectively, three kinds of ink sheet typically applied to the present invention. FIG. 1(*a*) shows the structure of a thermofusible ink sheet constructed with an ink layer 1 containing ink capable of being fused by applying heat thereto, a polyester base film 4, and a heat resisting and slipping layer 5, all of which are laminated in order. FIG. 1(*b*) shows the structure of a sublimation ink sheet constructed with an ink layer 2 containing ink capable of being sublimated by applying heat thereto, a polyester base film 4, and a heat resisting and slipping layer 5., FIG. 1(*c*) shows the structure of a sponge ink sheet constructed with a thermofusible ink layer 3, a polyester base film 4, and a heat resisting and slipping layer 3. The thermofusible ink layer 5 comprises porosity matrix of resin 6, coloring agent (colorant) 7, and low melting point material 8, as shown in FIG. 1(*c*).

The detail of the sponge ink sheet is illustrated hereinafter, as an example of ink sheet. The construction of the sponge ink sheet is formed in a state of an ink substrate containing therein thermofusible ink which is mixture of a coloring agent (colorant) and a low melting point material as main components.

As is the case of conventional thermal transfer printing system, the thermal head of this system applies heat energy to the thermofusible ink in the ink layer from the side of the base film and transfers thermofusible ink onto the recording medium (paper). In this system by changing the amount of heat energy to be applied to the ink layer, the amount of thermofusible ink transferred onto the recording medium (paper) can be controlled in accordance with the state of the microscopic porous resin structure in the ink layer. Namely, the melted ink containing the coloring agent and having low viscosity realized by applying heat energy passes through and infiltrates into the fine holes formed in the porous organization made of high melting point resin by the action of thermal expansion, capillary phenomenon, or pressing force, etc. When the heat energy applied to the thermal head is increased, the amount of transferred ink is also increased, microscopically being accompanied with square measure modulation or optical density modulation. In such a way, the ink layer transfers ink onto the recording medium in a state of optical density gradation transferring.

The component of the recording medium employed in this system is shown in Table 1. In the microscopic porous resin structure as shown in FIG. 1(*c*), the ink component consisting of oil and low melting point material (for example, wax) has a characteristic of immiscibility with the resin component. Under such the condition, the ink layer is formed by performing solvent-coating of the mixtures as shown in Table 1.

In such a construction of this printing device as mentioned heretofore, the characteristic of half tone printing can be largely improved, compared with the conventional printing device having no microscopic porous resin structure.

TABLE 1

| Component of recording Medium | |
|---|---|
| Structure Component | Material |
| Colorant | Dye (or Pigment) |
| Thermofusible Material | Wax, etc. |
| Auxiliary Agent for | Oil |

TABLE 1-continued

| Component of recording Medium | |
| --- | --- |
| Structure Component | Material |
| Porosity Matrix | |
| Porosity Matrix Resin | Thermoplastic Resin with High Melting Point |

Figure 2:
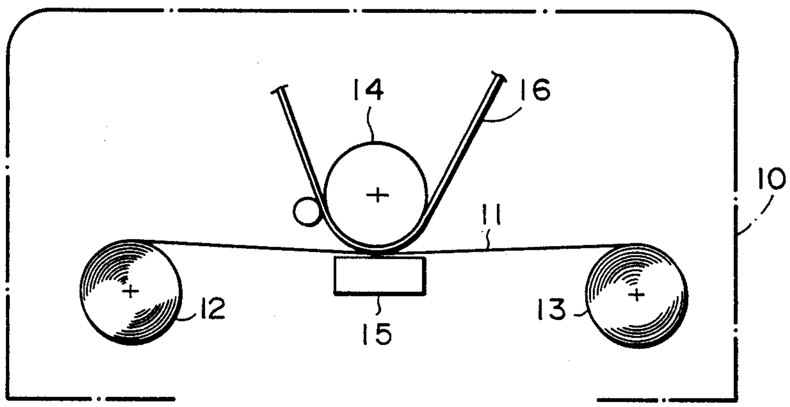
FIG. 2 is an explanatory view for explaining an embodiment of a printing device's structure according to the present invention.

FIG. 2 is an explanatory view for explaining an embodiment of a printing device's structure according to the present invention. In FIG. 2, an ink sheet 11 is installed in a state of an ink sheet roll in a mainbody 10 of the printing device, and the same extends from a sheet feeding roller 12 to a sheet winding-out roller 13 and the same is wound out in order. On the halfway of ink sheet's traveling path, a platen 14 and a thermal head 15 are so disposed as to oppose to each other and to hold the ink sheet therebetween, and a recording paper 16 is pressedly transported by means of the platten 14 passing through the space between the ink sheet 11 and the platen 14. As is well known, a plurality of heat generating resistors are arranged in the thermal head 15 in a row or in the other suitable way. The ink sheet is exchanged for the other one in accordance with the purpose of its use. The ink sheet selected at that time travels on the printing position between the thermal head 15 and the platen 14. Various methods have been proposed up to now for exchanging the ink sheet. For instance, three sorts of ink layer having a total dimension per one page are arranged on the ink sheet 11 in the order of ink layer surface; Y, M and C as one page area for two dimensional printing, and the same are arranged in order, respectively, for each page. The printing device is constructed such that the surface of ink sheet of corresponding page and corresponding sort is located at the printing position in response to a command (instruction) signal.

Figure 3:
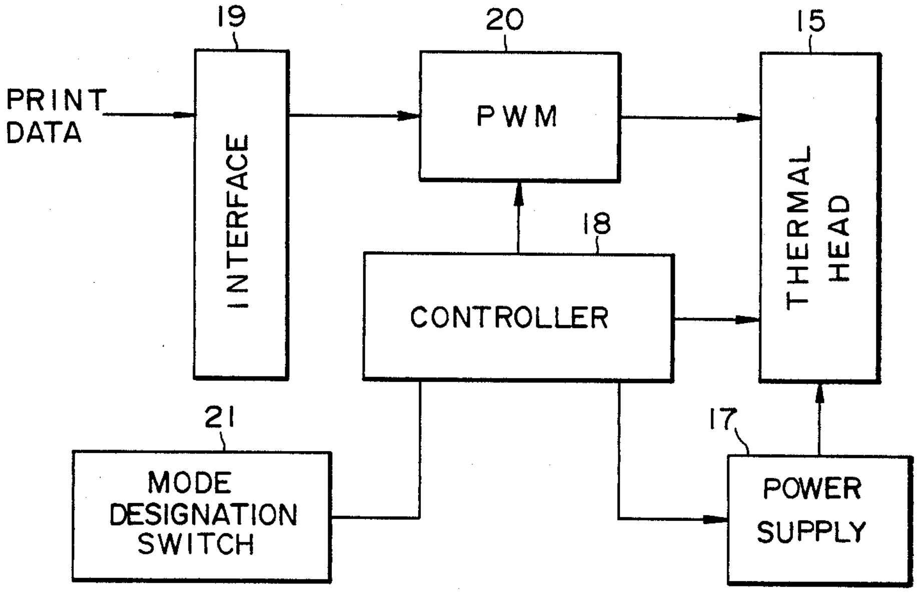
FIG. 3 is a circuit diagram of an embodiment of its control device.

A control device for controlling the operational function of the thermal head 15 utilizes, for instance, a construction as shown in FIG. 3. A power supply 17 supplies an operational electric power to the heat-sensitive head (thermal head) 15. On that occasion, the power supply 17 and the thermal head 15 are put into functioning state by the command issued from the controller 18 such that the voltage can be converted.

A print data signal is applied to a pulse width modulator (PWM) 20 through an interface 19, and thereby the thermal head 15 is put into operation by the action of the pulse signal correspondingly modulated in accordance with the command of the controller 18.

The controller 18 is connected with a process designation (mode designation) switch 21, and the command signal is transmitted to either one or both of the print pulse signal modulator (pulse width modulator) 20 and the operational power supply 17, in obedience to the command (instruction) from the process designation (mode designation) switch 21.

Figure 4:
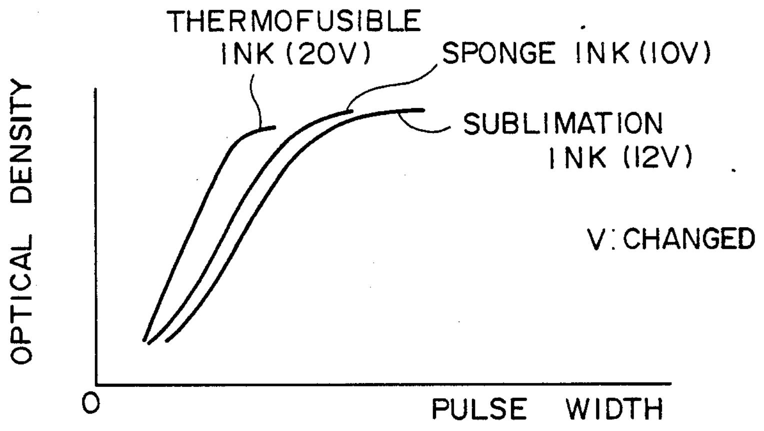
FIG. 4 is a relative characteristic graph showing the relationship between the pulse width and the density for explaining a difference of the printing head energy in accordance with the sort of ink.

The operationl heat energy for each process ink is different from the other, respectively, as shown in FIG. 4, and the heat energy is also different from the other in accordance with each printing density of ink. The heat energy to be applied to the ink from the thermal head is determined by the operational voltage and/or the operational time period (pulse width).

Figure 5:
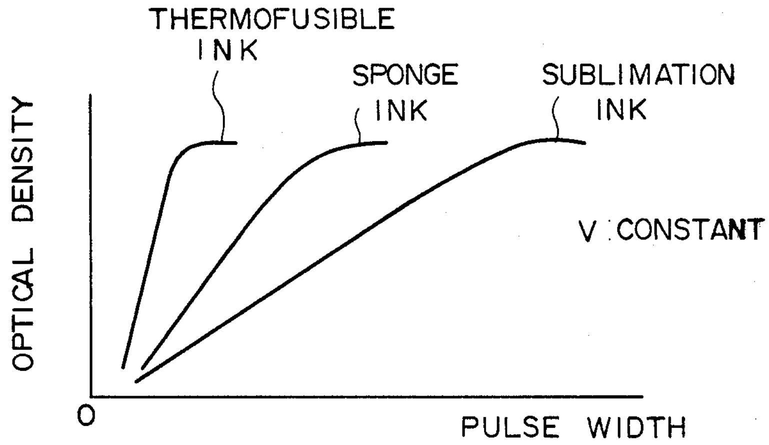
FIG. 5 is a relative characteristic graph showing the relationship between the pulth width and the density under the condition of setting up the voltage constant.

To take into consideration three sorts of ink; thermofusible ink, sponge ink and sublimation ink, a relationship between the printing density and the print signal's pulse width as shown in FIG. 5 can be obtained in the case of keeping constant the operational voltage of the power supply.

When the thermofusible ink is employed, even a slight variation of the pulse width or the operational time period changes the printing density sharply so that it may be difficult to express halftone. On the contrary, when the sublimation ink is employed, a considerable variation of the operational time period yields a slight change of the printing density. Namely, the difference of the heat energy amount is large in contrast with the slight difference of the printing density so that the density of halftone can be easily created.

Furthermore, supposing that the operational voltage in the case of each ink process is selected as shown in FIG. 4, the characteristic variation of each ink process can be made almost equal to each other.

When the thermofusible ink is employed, the thermofusible ink process is selected by changing over the process (mode) designation switch 21. In general, the thermofusible ink sheet is employed for printing characters.

The print data may be allowed to be transmitted as binary data such as presence or absence of the picture image, black and white, and so on. At this time, the print data signal is modulated in the pulse width modulator 20 to the signal of a pulth width tY for applying heat energy suitable for the thermofusible ink printing to the thermal head 15 as shown in FIG. 6(*a*), in conformity to the command (instruction) of the controller 18. The pulse signal modulated in such a way is sent out to the thermal head 15. The operational voltage for driving the thermal head 15 is set to, for instance, 20 V.

In the case of employing the sponge ink sheet, a mode of the sponge ink process is selected by changing over the process (mode) designation switch 21.

In order to express the picture image density, for instance, by dividing the halftone into thirty-two steps, the pulse signal as the print data is modulated to the signal having thirty-two kinds of pulse width. For instance, as shown in FIG. 6(*b*), the different pulse signals having thirty-two kinds of pulse width are sent out to the thermal head 15 in accordance with the density grade of image's halftone. To state in more detail, there are provided thirty-two pulse signals having thirty-two kinds of pulse width; ts1 (narrowest pulse width); ts1+ts2, ts1+2ts2, ts1+3ts2, - - - , ts3 (widest pulse width), as shown in FIG. 6(*b*). The pulse width is gradually graded up step by step being added ts2 one by one thereto. So, the widest pulse width ts3 turns out to be ts1+31ts2. Namely, thirty-two kinds of data(0–31) are sent out to the thermal head 15. The operational voltage is set up to, for instance, 10 V.

In the case of employing the sublimation ink sheet, a mode of the sublimation ink process (mode) is selected by changing over the process (mode) designation switch 21. The printer image density can form image so as to discriminate, for instance, sixty-four steps of image's halftone. Therefore, the data(0–63) are sent out to the thermal head as the picture image data. In order to show the respective steps of image's halftone, the time period of the signal or the pulse width is changed for the purpose of changing the operational time period in accordance with the density of image.

To generally express the data signal of halftone in the case of FIGS. 6(*b*) and 6(*c*), the pulse width of the respective data signals to be sent to the thermal head turns out to be as shown in FIG. 6(*d*), correspondingly to the data(0–n). This is only an example of the pulse width modulation. However, the present invention is not limited to the case of the pulse width modulation. For instance, the case of the pulse number modulation or other cases can be also applied to the present invention.

Figures 6A, 6B, 6C:
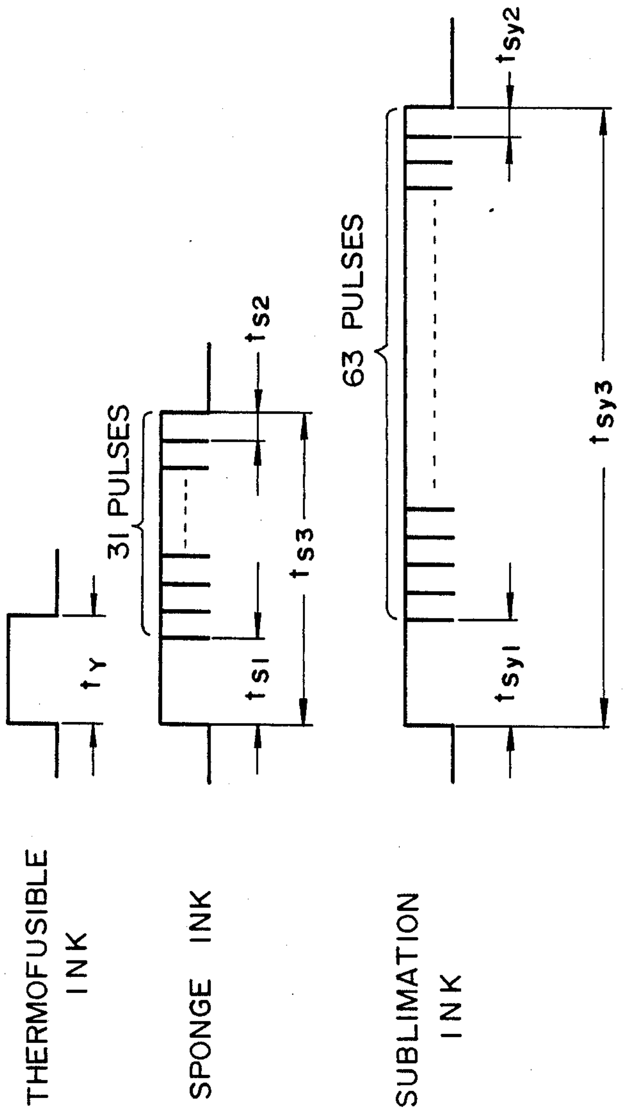
FIG. 6 is an explanatory view for explaining examples of the print pulse signal, wherein FIGS. 6(*a*), 6(*b*) and 6(*c*) are views, respectively, for explaining the difference of the pulse width in accordance with the respective sorts of ink.
Figure 6:
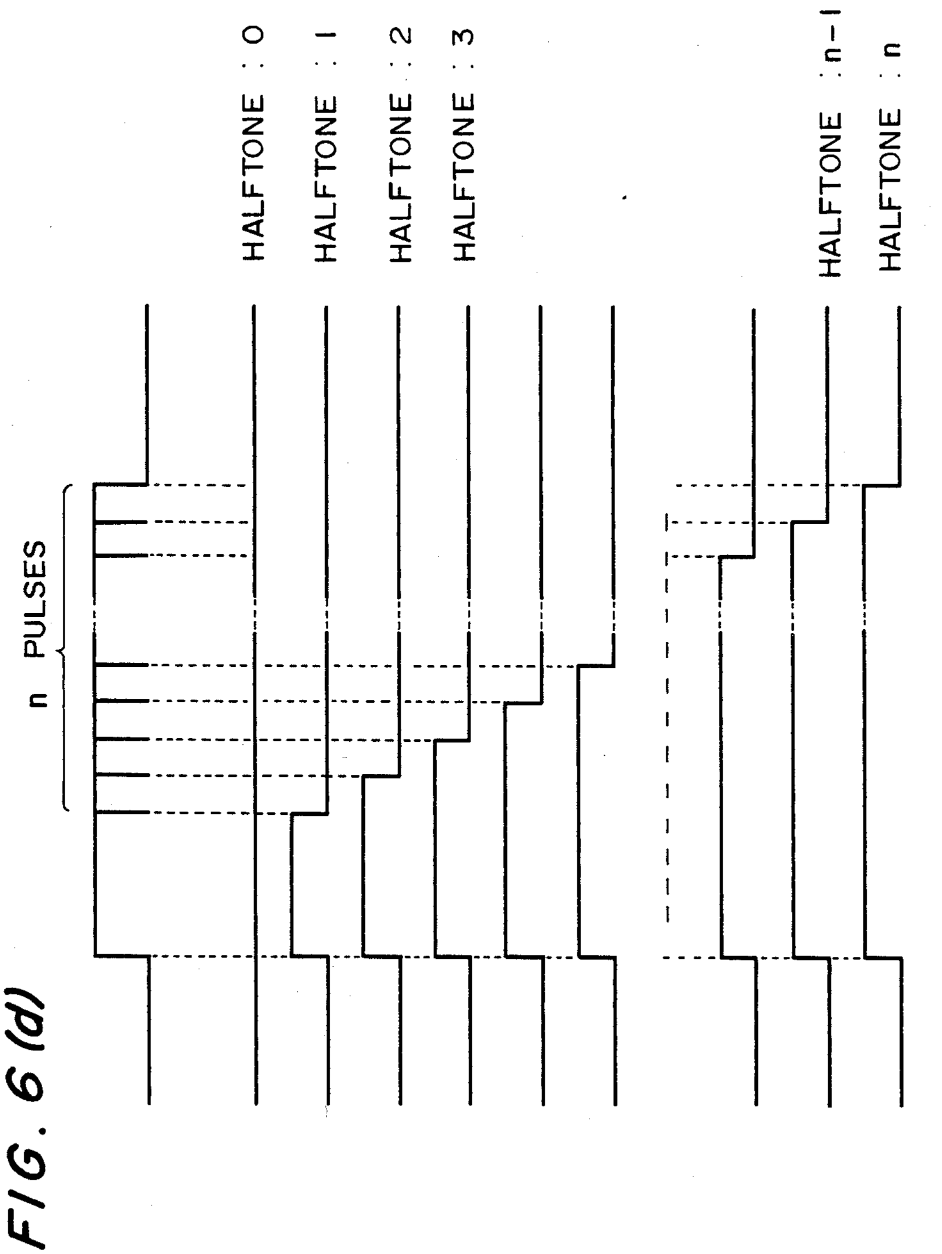

At first, if a pulse width tsy1 is necessary for printing picture image at a minimum, the first-stage halftone signal to be sent out is a signal of the pulse width tsy1 as shown in FIG. 6(c). Concerning the other half tone signals following to the first-stage halftone signal an additional pulse width tsy2 is added thereto one after another in the order of halftone stage's number. The additional pulth width tsy2 is a necessary step for expressing the respective differences in halftone of the following-stage signals. In such a way, the signals having the pulse widths of sixty-four steps ranging from the first-stage pulse width tsy1 to the sixty-four-stage pulse width tsy3 (longest pulse width) is generated from the pulse width modulator (PWM) 20 in obedience to the density grade of halftone.

Here, the pulse width tsy3 is expressed as follows:

$$tsy3 = tsy1 + 63tsy2$$

The pulse signal modurated by the pulse width modurator (PWM) 20 is sent out therefrom and applied to the thermal head 15.

The operational voltage for driving the thermal head 15 is set up, for instance, 10 V. In order to selectively use the above-mentioned three sorts of ink sheet, the following three steps are necessary steps to be performed. Those steps are:

(1) exchanging the ink sheet for the one to be used, (2) converting the voltage of the power supply to an operational voltage in obedience to the ink sheet to be used, and (3) sending out to the thermal head the print signal modulated to the signal having a pulse width in accordance with the halftone of image's density.

Namely, in the printing device, the controller 18 changes over the voltage of the power supply 17 in accordance with the signal from the process (mode) designation switch 21 and the pulse width modulator (PWM) 20 modulates the pulse width of the print data. In such a way, three or more sorts of ink sheet can be freely and changeably employed.

It may be also possible to set up the operational voltage at a constant value regardless of the sort of ink instead of changing over the operational voltage in accordance with the above-mentioned sort of ink. On this occasion, the pulse width of the signal has to be modulated in accordance with the selected voltage. Namely, the sort of ink and the picture image density's halftone can be exchanged only by a factor of the signal pulse width. Since the printing speed tends to slow down in such case, the above matter may be applicable to the printing device allowing delay of printing operation.

Otherwise, it may be also allowed to change the operational voltage in accordance with the sort of ink and the picture image density's halftone on the condition of keeping constant the pulse width of signal.

As is apparent from the foregoing description, according to the present invention, it has become possible that only one printing device performs a printing operation by use of various different sorts of ink sheet. And further, according to the present invention, it has also become possible that, in the case of printing mixture of the character and the full-color picture image, the former is printed by use of the fusion ink while the latter is printed by use of the sublimation ink. Furthermore, such printing operation can be done by use of only one printing device and by simple handling of the change-over switch. Moreover, the present invention has enabled only one common printing device to perform printing simply and by use of suitable ink. Namely, the thermofusible ink is used, in the case of printing characters at high speed. On the contrary, the sublimation ink is used, for the purpose of expressing halftone clearly. In this case, it may be allowed to take a lot of time in the ink process. Furthermore, the sponge ink is used, in the case of expressing a certain limited halftone and further performing print operation at high speed. Although the case of changing the pulse width is described heretofore, the present invention is not limited only to changing the pulse width. For instance, it will be allowed to change the pulse number instead of changing the pulse width in order to obtain the same effect.

In FIGS. 7 through 11, another embodiment of the present invention is described hereinafter. The embodiment relates to a printing device in which the ink sheet is exchanged for one of the other various different sorts of ink sheet and a print control is done in accordance with the sort of ink sheet, and the same is characterized in that the printing device comprises a sort discriminating portion for representing the sort of ink sheet formed on the ink sheet or the core for winding out the ink sheet and a judgement device for discriminating the afore-mentioned sort discriminating portion in a state of installing the ink sheet therein. The embodiment of the present invention will be described hereinafter.

Figure 7:
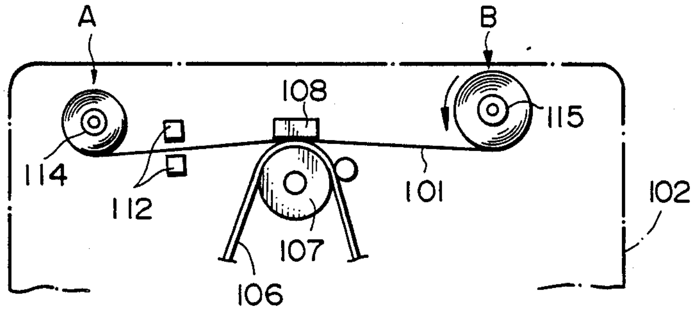
FIG. 7 is an explanatory construction view showing an outlined construction of another embodiment of a printing device according to the present invention.
Figure 8:
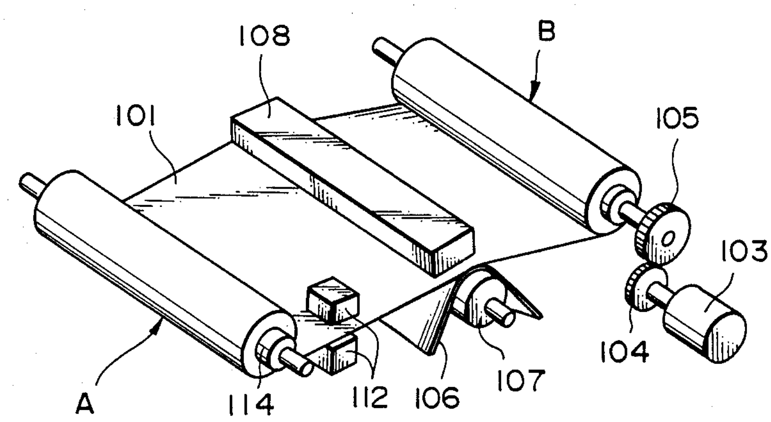
FIG. 8 is a perspective view of the printing device shown in FIG. 7.

FIG. 7 is an explanatory construction view showing an outlined construction of an embodiment of a printing device according to the present invention, and FIG. 8 is a perspective view thereof. In FIG. 7, the ink sheet 101 is installed in a printing device's main body 102 in a state of ink sheet roll. A sheet feeding core (roller) 114 of such the ink sheet roll is situated at a position of side A while a sheet winding-out core (roller) 115 thereof is situated at another position of side B. The ink sheet 101 is wound out at the sheet winding-out side B through gears 104 and 105 by the driving force of a motor 103 shown in FIG. 8. During the time of winding out the ink sheet in such a way, thermal transfer printing is carried out on a recording paper 106 by a thermal head 108 brought into pressed contact with a platen 107 through the ink sheet 101 and the recording paper 106.

Now, one of sheets different from each other in material to be painted thereon and in painting form is selectively used respectively. For instance, those are, thermofusible ink sheet, sublimation ink sheet and multi-stage halftone ink sheet, or the like. The former two examples are different from each other in material to be painted, and the latter one example is a sheet made in such a way that ink is contained in the porour layer coatingly deposited on its base substrate. The latter one falls under the category of the ink sheets different from each other in printing form.

In the printing device as mentioned heretofore, an ink sheet selected among such the different sorts of ink sheets is exchangeably set between the thermal head 108 and the platen 107 precisely at the printing position thereof and a print control is conducted in accordance with the sort of ink sheet as mentioned hereinafter. At this point, the "print control" signifies, for instance, changing the number of times of applying electric current (pulse signal) to the thermal head 108 in accordance with the sort of ink sheet or changing the current-applying time interval per one pulse.

Figure 9:
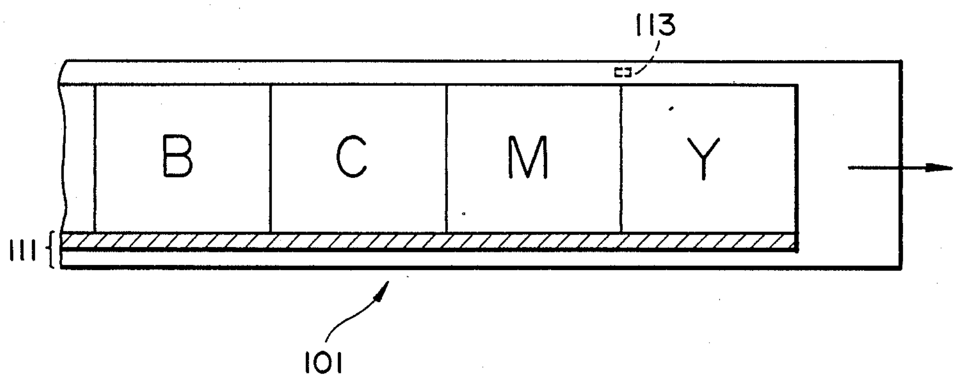
FIG. 9 is a construction view showing an ink sheet provided with a sort recognition area portion for recognizing the sort of ink sheet.

In this place, as shown in FIG. 9, ink layers of one-page size for respective colors; Yellow, Magenta, Cyan and Black represented by Y, M, C and B are arranged in order for each one page on the ink sheet 101, for example, in the case of employing the ink sheet for color-printing. In this case, omitting the ink layer of Black, only three sorts of ink layers can be arranged thereon. A plurality of ink layers, namely, three or four sorts of ink layers per one page having different colors are arranged on the ink sheet 101 in the order of the respective pages. And further, a sort recognition area 111 for representing the sort of ink sheet is formed on an area over the entire length thereof in the side edge area excluding a transferring area having the ink layer thereon. As shown in FIG. 7, the printing device constructed such that a sort of ink layer corresponding to the page and the color is transmitted onto the printing position in obedience to the command (instruction) signal sent from the printing device's main body is provided with a discrimination device 112 for discriminating such the sort recognition area 111 in conformity to the state of installed ink sheet as shown in FIG. 7.

Figure 10A:
FIGS. 10(*a*) and 10(*b*) are construction views showing, respectively, other sort recognition area portions.
Figure 10B:

As to the embodiment of ink sheet, as shown in FIG. 9, it may be possible to make a sort recognition area as the one having judgement code printed thereon. Such the judgement code is not limited to the state of light-and darkness (black-and-white). The judgement code having a varied arrangement of light-and-darkness can be formed on the designated area of the respective ink sheets as shown in FIG. 9, FIG. 10(*a*) and FIG. 10(*b*), in accordance with the sort of ink sheets such as the thermofusible ink sheet, the sublimation ink sheet and the multi-stage halftone ink sheet, etc. Moreover, it may be possible that a bar code or the like is employed as a judgement code.

The sort of ink sheet is discriminated in such a way as detecting the various different discrimination codes by means of the afore-mentioned discrimination device 112. As an example of the discrimination device 112, an optical sensor can be used. In the embodiment as shown in FIGS. 9 and 10, such discrimination codes are read out optically. And further, the print control as mentioned previously is performed on the basis of its discrimination result. Moreover, a mark shown by th reference numeral 113 in FIG. 9 is a positioning mark for beginning the ink transfer action from YELLOW (Y) at first.

Furthermore, it may be possible that a plurality of optical sensors are used as the discrimination device 112 and those sensors are combined with the print position represented by the discrimination codes in order to automatically discriminate various sorts of ink sheets. And further, any sensor capable of discriminating the sort of ink sheet can be used as a sort recognition sensor.

Figure 11A:
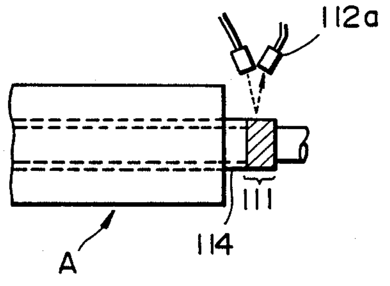
FIGS. 11(*a*) and 11(*b*) are construction views showing, respectively, modifications of the present invention, in which a sort recognition area portion is formed on the ink sheet winding-out core.
Figure 11B:
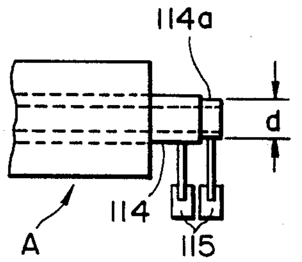

In an embodiment shown in FIG. 11(*a*), a sort recognition area 111 is formed on the exposed outer circumferential surface of the ink sheet feeding core 114 which is the ink sheet roll A for feeding ink sheet. The sort recognition area 111 is formed by various methods, for instance, by printing or the like. The density or the other state is different from each other in accordance with the sort of ink sheet. The discrimination device constructed with an optical sensor 112*a* optically detects the difference therebetween. In such a way, the sort of ink sheet can be discriminated automatically.

In another embodiment shown in FIG. 11(*b*), the diameter d at the tip end stepped portion 114*a* of the ink sheet winding-out core 114 is changed in accordance with the sort of ink sheet. As shown in FIG. 11(*b*), the discrimination device is constructed with a micro-switch 115 and single or plural discrimination devices are arranged against the core 114 in order to mechanically and automatically discriminate the sort of ink sheet. For instance, the number of the discrimination devices coincides with that of the sort of ink sheet. The diameter d of the ink sheet winding-out core 114 is changed in accordance with the sort of ink sheet as mentioned above. Or otherwise, it may be possible that concave and convex portions are formed on the ink sheet winding-out core 114 in accordance with the sort of ink sheet, and the state of the concave and convex surface thereof is discriminated by use of the discrimination device such as the micro-switch or the optical sensor.

A print control for the thermal head 108 is executed on the basis of the judgement result obtained by the discrimination device 112. As the control device for controlling the print operation of the thermal head 108, the printing device with the construction as shown in FIG. 3 can be utilized, for example. Since the operational principle of the control device employed for this embodiment is quite same as that of the former embodiment, the explanation thereof is omitted here.

As is apparent from the foregoing description, the sort of ink sheet can be easily discriminated automatically only by exchanging the ink sheet for the other one according to the present invention. Furthermore, the appropriate print control can be executed in accordance with the sort of ink sheet, without commiting any wrong function.

In FIGS. 12 through 19, still another embodiment of the present invention is described hereinafter. The embodiment relates to a mechanism for automatically judging the number of ink medium's color in the thermal head type printing device in which printing is performed by transferring the ink contained in the ink layer of the ink medium such as an ink ribbon, an ink sheet, or the like onto a recording sheet. The mechanism as mentioned above can be applied to the thermal head type printing device which executes thermal transfer or electricity-circularizing transfer respectively by use of thermal head or laser beam head in the field of the character printing device such as printer, plotter, typewriter, etc., the printing press machine, the facsimile device, and so on.

There are two kinds of printing device in such thermal transfer type printing device, those are, a printing device executing monochromatic print by use of monochromic ink medium (for instance, black ink) and another printing device executing color print by use of color ink medium. Furthermore, concerning the color print there are several cases in which three sorts of ink; Yellow, Magenta and Cyan are used, or otherwise four or five sorts of ink; Yellow, Magenta, Cyan, White and/or Black, etc. are used in the printing device.

However, the discrimination device for automatically discriminating the number of the ink medium's colors has not yet proposed up to this time. For this reason, formerly, when the ink medium was exchanged for the other one the switch is changed over manually in order to change the sequence of the printing device's main body.

In such a conventional situation, the printing device had several defects that manual operation has been apt to be forgotten or become very troublesome. And further, in addition to the above defects, the number of the color of ink medium already set in the printing device couldn't be easily discriminated.

In the thermal transfer type printing device in which an ink medium such as ink sheets 211, 211*a* and 211*b*, an ink ribbon or the like is superposed on a recording sheet 217, and ink contained in an ink layer of the above-mentioned ink medium is transferred onto the recording sheet 217 by applying heat or circularizing electricity to the ink layer in order to execute an adequate printing on the recording sheet, the discrimination mechanism for automatically discriminating the number of ink medium's color is characterized in that grooves 218*a* and 218*b* and color's number indicating means such as color's number indicating mark 228 or 237, or a disc 241, etc. for indicating the number of color are provided at the edge portion of the above-mentioned ink medium or at the end portion of the cylindrical core tubes 210, 210*a*, 210*b*, 215, 215*a*, and 215*b*, and the indication of color's number is detected by the detection means such as a micro-switch 227 or 243 or a sensor 229 or 238, and further the detection signal is transmitted to a controller for discriminating the number of color, and finally the sequence of the main body of the printing device itself is changed on the basis of the discriminated information.

The other embodiment and its modifications shown in FIGS. 12 through 19 according to the present invention will be described in detail hereinafter.

Figure 18:
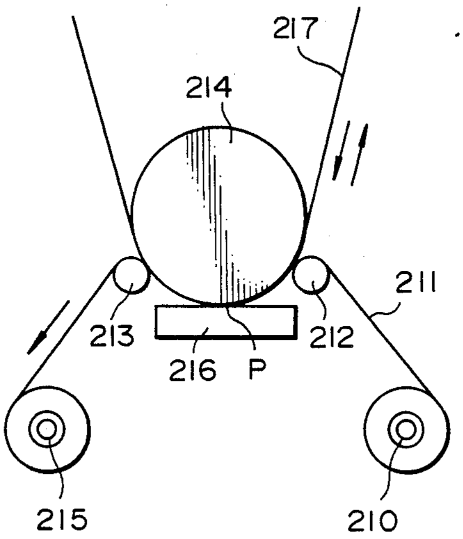
FIG. 18 is an explanatory construction view for explaining the thermal transfer type printer applicable to the present invention.

FIG. 18 shows a thermal transfer type line printer provided with a discrimination mechanism for automatically discriminating the number of ink medium's color according to the present invention. In FIG. 18, the reference numeral 210 designates a sheet feeding cylindrical core. An ink sheet 211 is wound around the cylindrical core 210, and the same is taken out therefrom. Guide rollers 212 and 213 guide the ink sheet 211 and bring it into pressing contact with a platen 214. Thereafter, the guided ink sheet 211 is wound out around a sheet winding-out cylindrical core 215. A thermal head 216 is disposed so as to oppose to the platen 214 through the ink sheet 211 interposed therebetween. The thermal head can be detachably installed on the platten 214 by use of well-known means such as cam, solenoid, etc., all not shown in FIG. 18. Now, supposing that a recording sheet 217 is inserted into the gap between the platen 214 and the ink sheet 211 as shown in FIG. 18, that the thermal head 216 is brought into pressing contact with the platen 214 in order to execute printing on the recording sheet 217, and that both of the platen 214 and the sheet winding-out cylindrical core are driven by a driver such as motor in order to transport the ink sheet 211, the recording sheet 217 is drawn into the space between the platten 214 and the ink sheet 211 and pluralheat-discharging elements arranged along a line in the thermal head 216 adequately discharges heat energy at the printing position P on which the thermal head 216 is brought into pressing contact with the platen 214 through the ink sheet 211 and the recording sheet 217. And further, the ink contained in the ink layer of the ink sheet corresponding to the printing position P is transferred onto the recording sheet 217. The platen 214 is rotated during the time of executing the process of ink transferring onto the recording sheet 217. In such a way, it followed that the recording sheet 217 is printed successively.

Figure 19:
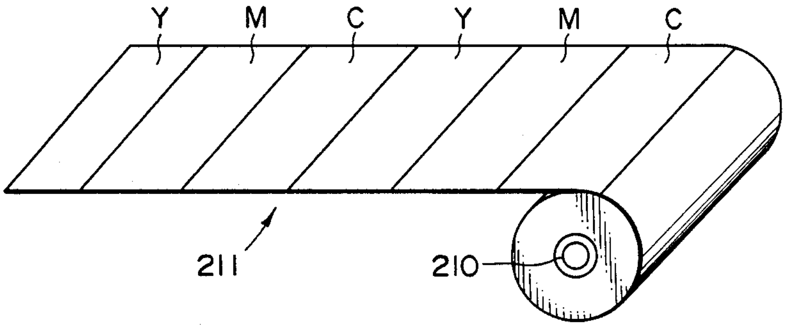
FIG. 19 is a perspective view showing a state in which the color ink sheet is wound around the cylindrical core tube.

Incidentally, concerning such a thermal transfer type line printer, there are two cases in which a monochromatic print is executed by use of monochromatic ink sheet and a color print is executed by use of color ink sheet. In the case of executing the color print, for example, the color ink sheet 211 used for printing is repeatedly provided with three-color ink layers of Yellow (Y), Magenta (M) and Cyan (C) as shown in FIG. 19. Or otherwise, the ink sheet is repeatedly provided with four-color ink layers of Yellow (Y), Magenta (M), Cyan (C) and White (W) or five-color ink layers of Yellow (Y), Magenta (M), Cyan (C), White (W) and Black (B). However, it is necessary to change the sequence of the printer's main body in accordance with the number of ink sheet's color. Hence, the present invention takes (devices), for example, a proper measure as mentioned hereinafter, in order to automatically discriminate the number of ink sheet's color and thereby to automatically change the sequence thereof.

Figure 12A:
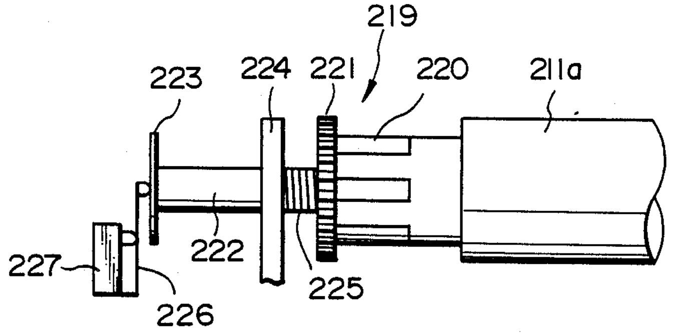
FIGS. 12(*a*) and 12(*b*) are explanatory views showing still another embodiment of the present invention, wherein FIG. 12(*a*) shows a case of using the cylindrical core having shallow grooves and FIG. 12(*b*) shows another case of using the cylindrical core having deep grooves.
Figure 12B:
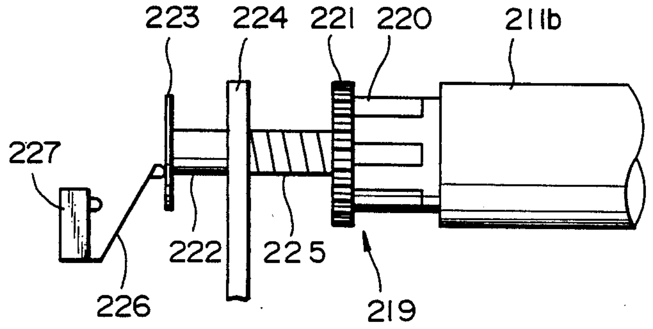
Figure 13A:
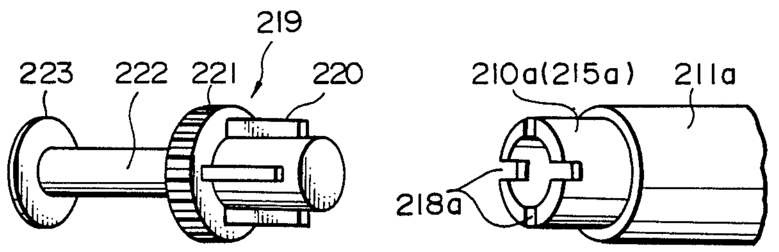
FIGS. 13(*a*) and 13(*b*) are explanatory views for explaining the cylindrical core and the core acceptor in a separated state.
Figure 13B:
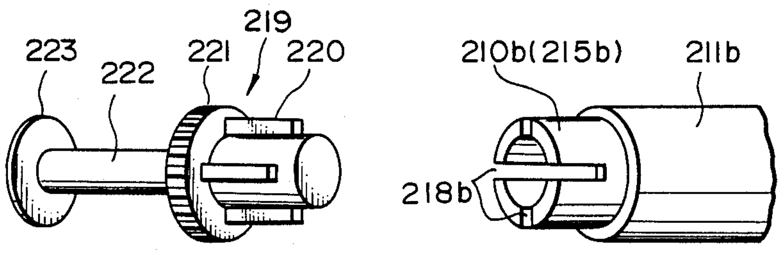

Firstly, in the embodiment shown in FIGS. 12(*a*) and 12(*b*) and FIGS. 13(*a*) and 13(*b*), a plurality of grooves are formed at the end portion of the ink sheet feeding cylindrical core 210 or the ink sheet winding-out cylindrical core 215. As shown in FIGS. 13(*a*) and 13(*b*), the grooves 218*b* of the cylindrical core 210*b* or 215*b* for winding therearound four-color ink sheet 211*b* are deeper than the grooves 218*a* of the cylindrical core 210*a* or 215*a* for winding therearound three-color ink sheet 211*a*. Claws 220 of the core acceptor 219 are insertingly engaged with those grooves 218*a* or 218*b*. The core acceptor 219 has a drive force transmitting gear 221 and a disc 223 provided at one end of a center shaft 222 unitarily formed with the gear 221, and the same is supported by a fixing plate 224. And further, a compression coil spring 225 is disposed in a space between the side surface of the drive force transmitting gear 221 and the fixing plate 224. The spring 225 gives the core acceptor 219 a movement peculiarity of always moving rightward as shown in FIG. 12(*a*). In such a construction, as shown in FIG. 12(*a*), when the three-color ink sheet 211*a* is used the groove 218*a* is shallow so that the core acceptor 219 is located at the left position. On such occasion, an operational piece 226 of the micro-switch 227 is brought into direct contact with the disc 223, and thereby the micro-switch is turned on. And further, as shown in FIG. 12(*b*), when the four-color ink sheet 211*b* is used the groove 218*b* is deep so that the core acceptor 219 is pushed rightward by the coil spring 225. At this time, the micro-switch is turned off. The ON-OFF signal generated by the micro-switch 227 is transmitted to the controller. The controller discriminates the number of ink sheet's color and changes the sequence of the printer's main body.

Figure 14:
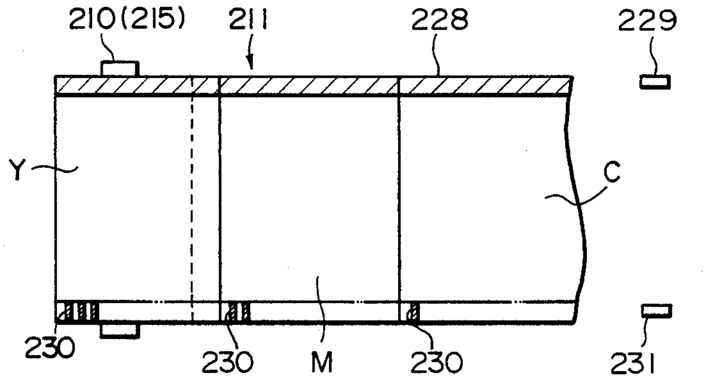
FIG. 14 is a plan view of the cylindrical core winding the ink sheet therearound for explaining a modification of the embodiment shown in FIGS. 12 and 13.

Secondly, in a modification of the embodiment shown in FIG. 14, a color number indication mark 228 is formed on the one-side end portion of the ink sheet 211, and a color number discriminating sensor 229 detects the color number indication mark 228. The detection signal generated by the sensor 229 is transmitted to the controller. The controller discriminates the number of the ink sheet's color and changes the sequence of the printer's main body.

Moreover, in the modification shown in FIG. 14, various color indication marks 230 different from each other per respective colors such as Yellow (Y), Magenta (M), and Cyan (C) are arranged on the other end portion of the ink sheet 211 such that a color discriminating sensor 231 can detect the color indication marks 230.

Figure 15:
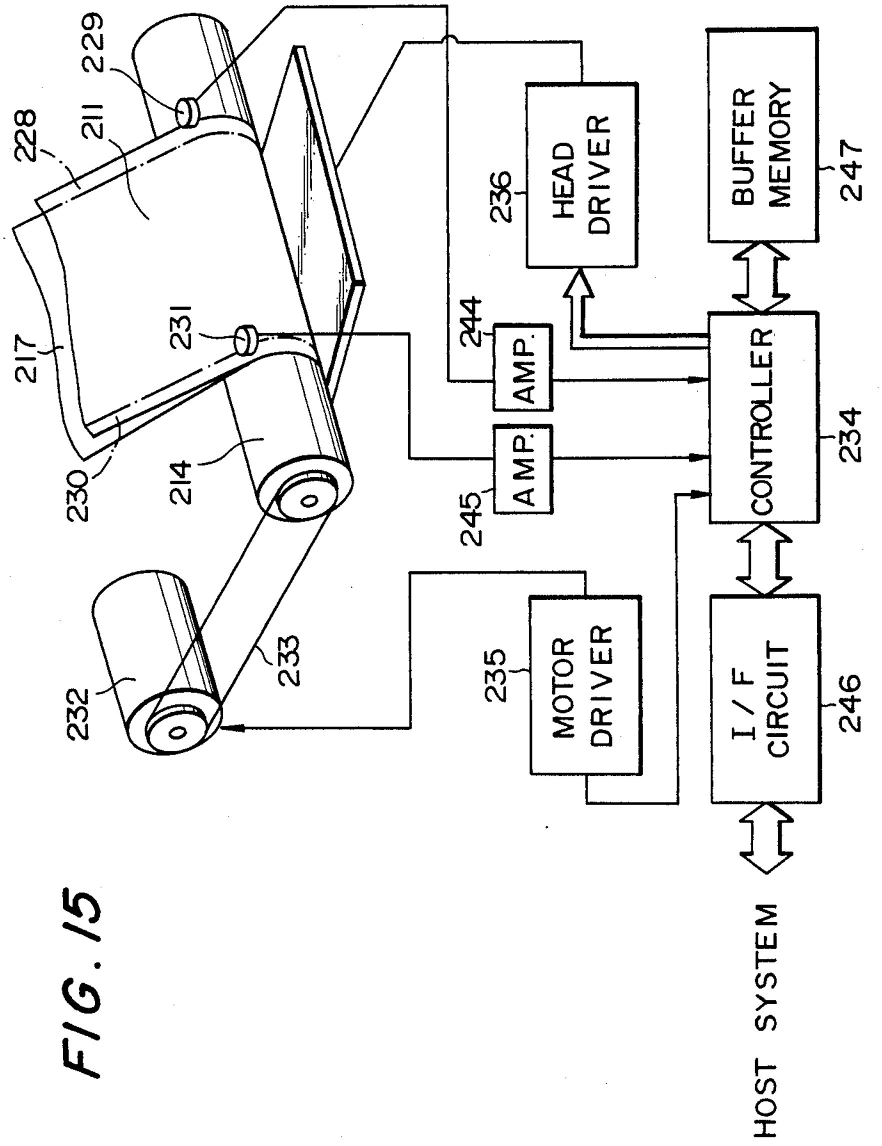
FIG. 15 is an explanatory view for explaining the outline of the printing device provided with the automatic color number discriminating mechanism as shown in FIG. 4.

FIG. 15 is an explanatory block diagram for explaining the outline of the printing device as mentioned heretofore. In FIG. 15, the reference numeral 232 designates a motor for transporting paper. The paper transporting motor drives the platen 214 through the medium of a belt 233. The recording paper 217 is pressedly inserted into the gap between the platen 214 and the ink sheet 211, and the same is transported by the action of the rotating platen 214. As mentioned before, the color number indication mark 228 and the color indication marks 230 are formed, respectively, on both end portions of the ink sheet 211. A color number discriminating sensor 229 and a color discriminating sensor 231 are respectively arranged so as to oppose to the respective marks. And further, the respective detection signals generated by the sensors 229 and 231 are respectively transmitted through amplifiers 244 and 245 to a controller 234 for discriminating color number and color. In sucha construction as mentioned heretofore, the sequence of the controller is adequately selected so as to regulate a motor driver 235, a character printing head driver 236, and so on.

Figure 16:
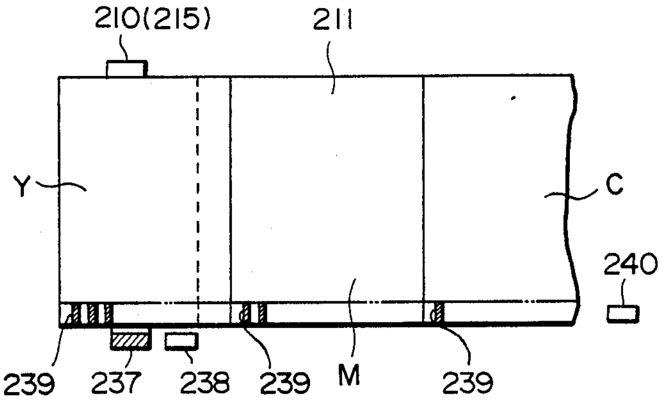
FIG. 16 is a plan view of the cylindrical core winding the ink sheet therearound for explaining another modification of the embodiment.

In another modification of the embodiment shown in FIG. 16, a color number indication mark 237 is formed on the one-side end portion of the ink sheet feeding cylindrical core 210 or the ink sheet winding-out cylindrical core 215, and a color number indicating (discriminating) sensor 238 detects the color number indication mark 237. In FIG. 16, color indication marks 239 are also formed on the one-side end portion of the ink sheet 211, and a color discriminating sensor 240 detects the color indication mark 239.

Figure 17:
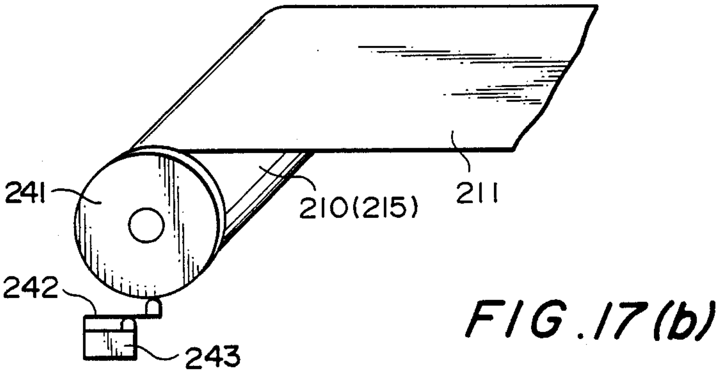
FIGS. 17(*a*) and 17(*b*) are explanatory perspective views showing still another modification of the embodiment, wherein FIG. 17(*a*) shows the case of attaching the disc to the core and FIG. 17(*b*) shows the other case of attaching no disc thereto.
Figure 17:
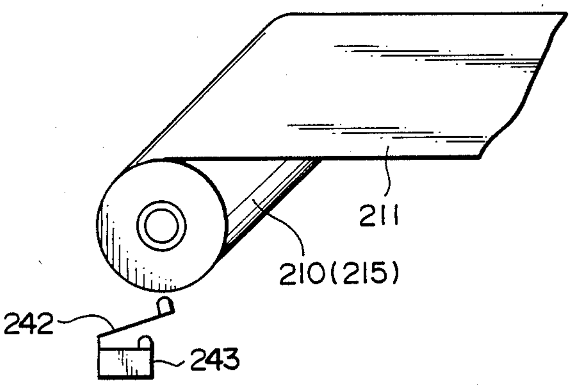

In still another modification shown in FIGS. 17(*a*) and 17(*b*), a disc 241 is mounted on the one-side end portion of the ink sheet feeding cylindrical core 210 or the ink sheet winding-out cylindrical core 215 such that the disc 241 and each of the respective cores 210 and 215 can unitarily rotate. A micro-switch 243 having an operational piece 242 to be brought into pressing contact with the outer circumference of the disc 241 detects the presence or absence of the disc 241. In such a way, the number of ink sheet's color is discriminated.

In the modifications as mentioned above, the number of ink sheet's color is discriminated by detecting the color number indication mark 228 or 237 or by detecting the presence or absence of the disc 241. Or otherwise, it may be allowed to discriminate the number of ink sheet's color by detecting the indication state of the color number indication mark 228 or 237 or the outer circumferential configuration.

Furthermore, it may be allowed that adequate notches are provided instead of the color number indication mark 228 or 237 and the number of ink sheet's color is discriminated by detecting the notches by use of a light-transmitting permeable sensor.

In the above-mentioned embodiment and its modifications, thermal transfer type line printer has been described heretofore. The embodiment and its modifications can be also applied to the transfer type serial printer using the ink ribbon in a similar way. Namely, for instance, a color number indication mark is formed on the cylindrical core for winding the ink ribbon therearound and detection means such as sensor, micro-switch, etc. detects the color number indication mark in order to discriminate the number of the ink sheet's color.

Furthermore, the present invention can be applied not only to the printer but also to the printing press machine or the printing device for use in the facsimile or the like in addition to the character printing device such as the plotter, the typewriter and so on. The application of the present invention is not limited to the thermal head type printing device. The present invention can be further applied to the other heat-sensitive printing device executing thermal transfer by use of the laser beam or the like.

Consequently, in the heat-sensitive printing device such as the thermal transfer type printer, the ink medium such as the ink sheet or the ink ribbon, etc. is set therein and the number of ink color can be automatically discriminated, according to the present invention. Namely, whether the ink to be used is monochromatic or multi-colored is discriminated. Or otherwise, in the case of color-printing, whether the number of ink color is three or four or five is discriminated. The controller can change the sequence on the basis of discrimination result. In such a way, some troubles such as forgetting to perform the manual operation or troublesome manual operation as is in the conventional case can be eliminated completely.

FIG. 18 is an explanatory construction view for explaining the thermal transfer type printer applicable to the present invention and FIG. 19 is a perspective view showing a state in which the color ink sheet is wound around the cylindrical core tube.

In such a construction as mentioned heretofore, the aforementioned problems concerning the conventional printer can be solved, according to the present invention.

While the above-mentioned matter provides a full and complete disclosure of the preferred embodiments of the present invention, various modifications or variations of the present invention may be possible for those skilled in the art after receiving the teachings of the present disclosure without departing from the scope of the present invention. Therefore, the above description and illustration should not be construed as limiting the scope of the invention, which is defined by the appended claims.

What is claimed is:

1. A thermal transfer type color printing device, in which one of a plurality of ink sheets is selectively used and a print control is performed in accordance with a sort of said ink sheet, said color printing device comprising:

(a) a thermal head provided with a plurality of heat generating resistors arranged therein, (b) a plurality of ink sheets, (c) installment means capable of selecting one of said plurality of ink sheets and selectively installing the same in said printing device, (d) a recording medium brought into direct contact with said selected ink sheet, (e) a heat energy source for driving said thermal head, and (f) switching means for changing heat energy driving said thermal head in accordance with said sort of said selected ink sheet.

2. A thermal transfer type printing device as defined in claim 1, in which said conversion of heat energy is performed by changing the state of a control signal for controlling the operation of said thermal head.

3. A thermal transfer type printing device as defined in claim 2, in which said conversion of heat energy is performed by changing the pulse width of a control signal for controlling the operation of said thermal head.

4. A thermal transfer type printing device as defined in claim 2, in which said conversion of heat energy is performed by changing the pulse number of a control signal for controlling the operation of said thermal head.

5. A thermal transfer type printing device as defined in claim 2, in which said conversion of heat energy is performed by changing the voltage generated from the power source for driving said thermal head.

6. A thermal transfer type printing device as defined in claim 5, in which said conversion of heat energy is performed by changing the voltage generated from the power source for driving said thermal head and the pulth width of said control signal for controlling the operation of said thermal head.

7. A thermal transfer type printing device as defined in claim 5, in which said conversion of heat energy is performed by changing the voltage generated from the power source for driving said thermal head and the pulse number of said control signal for controlling the operation of said thermal head.

8. A thermal transfer type printing device as defined in claim 1, said ink sheet comprises ink layer, base film and heat resisting and slipping layer.

9. A thermal transfer type printing device as defined in claim 8, said ink sheet is constructed with thermofusible ink layer.

10. A thermal transfer type printing device as defined in claim 8, said ink sheet is constructed with sublimation ink layer.

11. A thermal transfer type printing device as defined in claim 8, said ink sheet is constructed with sponge ink layer.

12. A thermal transfer type color printing device, in which one of a plurality of ink sheets is selectively used and a print control is performed in accordance with a sort of said ink sheet, said color printing device comprising:

(a) a thermal head provided with a plurality of heat generating resistors arranged therein, (b) a plurality of ink sheets wound out on a cylindrical ink sheet winding-out core, (c) installment means capable of selecting one of said plurality of ink sheets and selectively installing the same on said printing device, (d) a recording medium brought into direct contact with said selected ink sheet, (e) a heat energy source for driving sad thermal head, (f) switching means for changing heat energy driving said thermal heat in accordance with said sort of said selected ink sheet, (g) a sort recognition mark for representing a sort of said ink sheet to be installed in said color printing device, (h) a sort discrimination device for recognizing the state of said sort recognition mark, (i) a color recognition mark for representing a color of ink distributed on said ink sheet, and (j) a color discrimination device for recognizing the state of said color recognition mark.

13. A thermal transfer type color printing device as defined in claim 12, in which both of said sort recognition mark and said color recognition mark are formed on the surface of said ink sheet.

14. A thermal transfer type color printing device as defined in claim 12, in which said sort recognition mark is formed on said sheet winding-core and said color recognition mark is formed on the surface of said ink sheet.

15. A thermal transfer type color printing device as defined in claim 12, in which said switching means for changing heat energy comprises:

means for changing the state of a control signal for controlling the operation of said thermal head.

16. A thermal transfer type color printing device as defined in claim 15, in which said switching means for changing heat energy comprises:

means for changing the pulse width of a control signal for controlling the operation of said thermal head.

17. A thermal transfer type color printing device as defined in claim 15, in which said switching means for changing heat energy comprises:

means for changing the pulse number of a control signal for controlling the operation of said thermal head.

18. A thermal transfer type color printing device as defined in claim 15, in which said switching means for changing heat energy comprises:

means for changing the voltage generated from the power source for driving said thermal head.

19. A thermal transfer type color printing device as defined in claim 18, in which said switching means for changing heat energy comprises:

means for changing the voltage generated from the power source for driving said thermal head and changing the pulse width of said control signal for controlling the operation of said thermal head.

20. A thermal transfer type color printing device as defined in claim 18, in which said switching means for changing heat energy comprises:

means for changing the voltage generated from the power source for driving said thermal head, and means for changing the pulse number of said control signal for controlling the operation of said thermal head.

21. A thermal transfer type color printing device as defined in claim 12, wherein said said ink sheet comprises an ink layer, a base film and a heat resisting and slipping layer.

22. A thermal transfer type color printing device as defined in claim 21, wherein said ink layer is constructed with a thermofusible ink layer.

23. A thermal transfer type color printing device as defined in claim 21, wherein said ink layer is cnstructed with a sublimation ink layer.

24. A thermal transfer type color printing device as defined in claim 21, wherein said ink layer is constructed with a sponge ink layer.

25. A thermal transfer type color printing device, in which one of a plurality of ink sheets is selectively used and a print control is performed in accordance with a sort of said ink sheet, said color printing device comprising:

(a) a thermal head provided with a plurality of heat generating resistors arranged therein, (b) a plurality of ink sheets, (c) installment means capable of selecting one of said plurality of ink sheets and selectively installing the same on said printing device, (d) recording medium brought into direct contact with said selected ink sheet, (e) a heat energy source for driving said thermal head, and (f) switching means for changing heat energy driving said thermal head in accordance with said sort of said selected ink sheet, comprising means for changing the voltage generated from the power source for driving said thermal head and means for changing the pulse width of said control signal for controlling the operation of said thermal head.

26. A thermal transfer type color printing device, in which one of a plurality of ink sheets is selectively used and a print control is performed in accordance with a sort of said ink sheet, said color printing device comprising:

(a) a thermal head provided with a plurality of heat generating resistors arranged therein, (b) a plurality of ink sheets, (c) installment means capable of selecting one of said plurality of ink sheets and selectively installing the same on said printing device, (d) recording medium brought into direct contact with said selected ink sheet, (e) a heat energy source for driving said thermal head, and (f) switching means for changing heat energy driving said thermal head in accordance with said sort of said selected ink sheet, comprising means for changing the voltage generated from the power source for driving said thermal head and means for changing the pulse number of said control signal for controlling the operation of said thermal head.

* * * * *